July 11, 1939.　　　R. M. SCHOFIELD　　　2,165,512
CAMERA PERISCOPE
Filed March 30, 1938　　　3 Sheets-Sheet 3
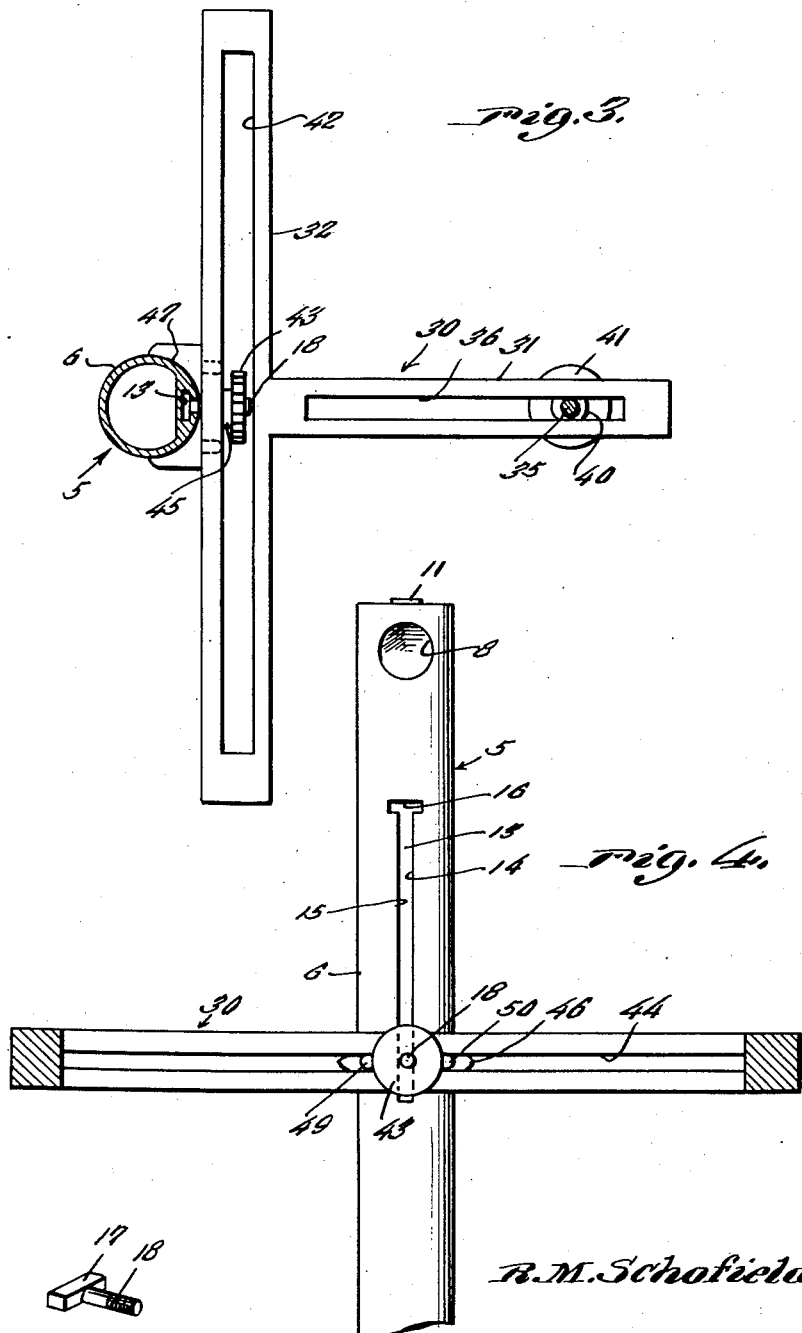

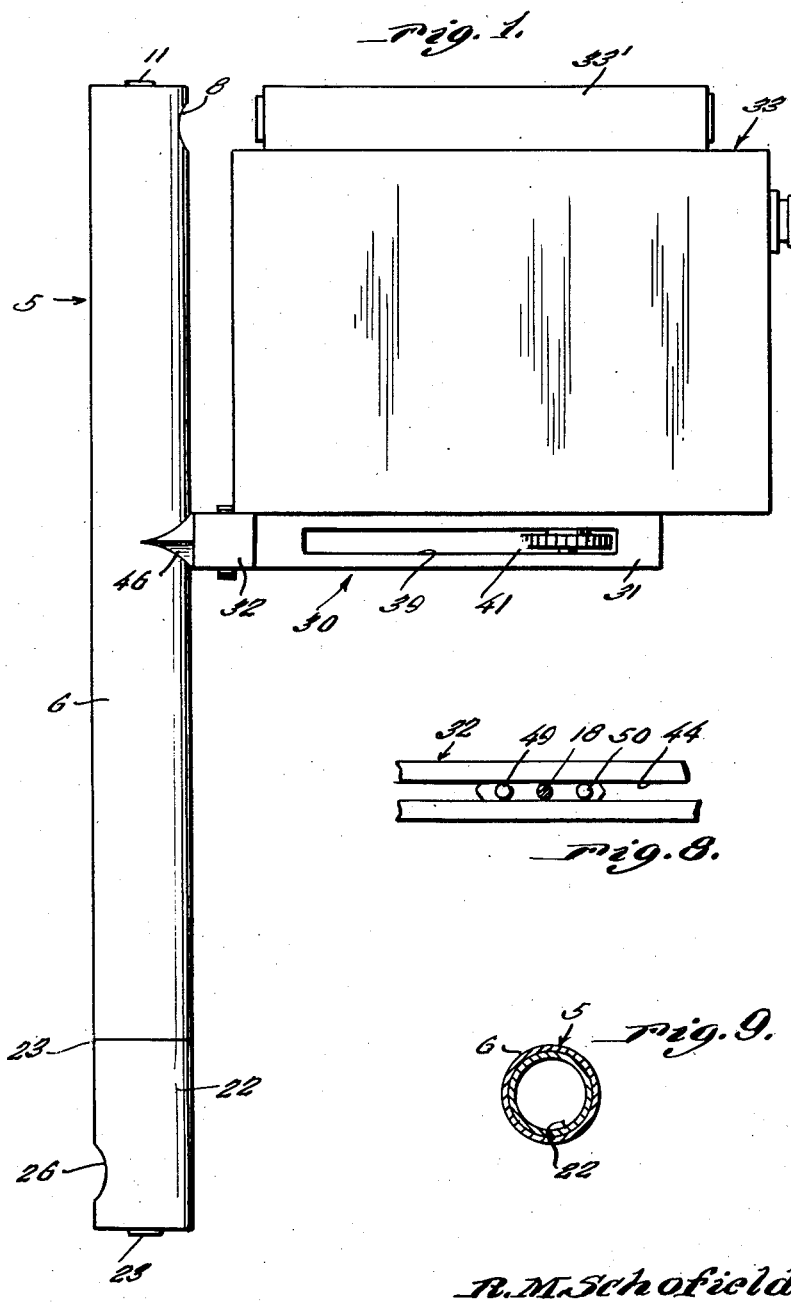

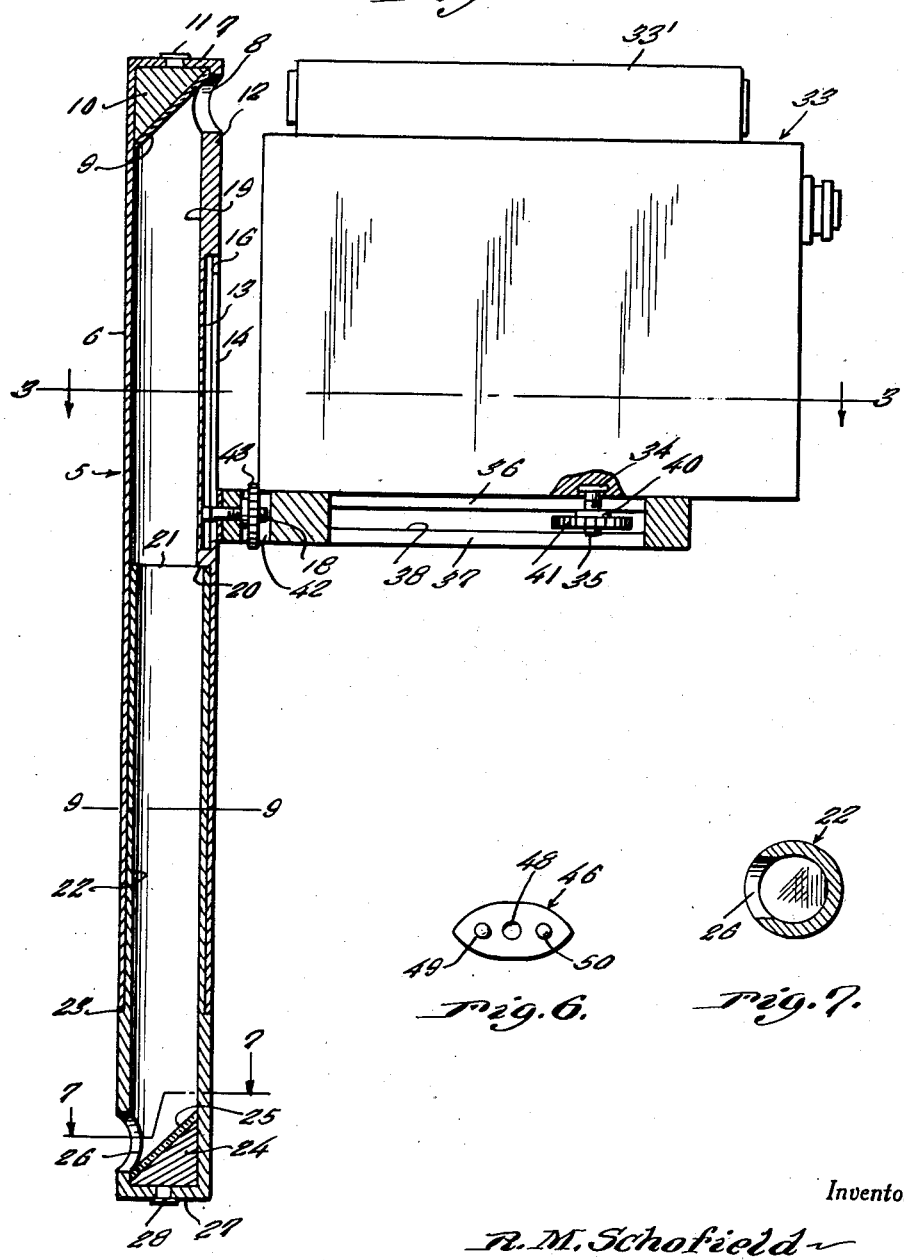

Patented July 11, 1939

2,165,512

UNITED STATES PATENT OFFICE 2,165,512

CAMERA PERISCOPE

Ralph M. Schofield, West Medford, Mass.

Application March 30, 1938, Serial No. 199,033

2 Claims. (Cl. 95—86)

My invention relates generally to means enabling an operator to sight and focus a camera of either the still or movie variety while holding the camera at an elevation above the line of sight of the operator, and particularly to an arrangement of this character which is adjustable for use at different elevations, and is adjustable to support cameras of different sizes, and an important object of my invention is to provide a simple and efficient arrangement of this character which can be provided at relatively low cost.

Another important object of my invention is to provide a periscope arrangement of the character indicated which has support means for the camera, the said support means being laterally and vertically adjustable relative to the viewing tube, so that the position of the camera relative to the viewing tube can be readily changed to bring into use different view finding devices on the camera and for other purposes.

Other important objects of my invention will be apparent from a reading of the following description taken in connection with the drawings, wherein for purposes of illustration I have shown a preferred embodiment of my invention.

In the drawings:

Figure 1 is a general side elevational view showing an arrangement in accordance with the present invention and showing a conventional type of movie camera associated therewith.

Figure 2 is a vertical longitudinal sectional view taken through a portion of the camera support and the viewing tube and showing the viewing tube in fully collapsed position, and the camera support in a depressed position.

Figure 3 is a horizontal sectional view with the camera removed and taken through Figure 2 approximately on the line 3—3 and looking downwardly in the direction of the arrows.

Figure 4 is an enlarged transverse vertical sectional view taken through Figure 2.

Figure 5 is a perspective detail of the combined slide and clamping screw.

Figure 6 is an elevational view of the clamping screw plate.

Figure 7 is a horizontal sectional view taken through Figure 2 approximately on the line 7—7 and looking downwardly in the direction of the arrows.

Figure 8 is an elevational detail showing the lugs on the clamping plate engaged with the slot in the transverse member of the camera support.

Figure 9 is a horizontal sectional view taken through Figure 2 approximately on the line 9—9.

Referring in detail to the drawings, the numeral 5 generally designates the viewing tube or periscope which comprises the outer tube 6 which is cylindrical in form and is provided with a closed top 7 just below which is the forwardly or outwardly facing light collecting opening 8 which is aligned with the mirror 9 which is secured to a triangular cross section block 10 to dispose the mirror at an angle of approximately 45 degrees. A clamping screw 11 passes through an opening in the top 7 of the tube section 6 and threads into the block 10, with the head of the screw engaging the top 7 in such a way that tightening the screw clamps the mirror block in place. From the point designated 12 the front wall of the tube 6 is thickened to provide space and rigidity of construction for the vertical slot 13 which has overhanging spaced flanges 14 defining the smaller slot 15 which terminates at its upper end in a cross head 16 of sufficient size and transverse dimension to admit into the slot 13 the slide 17 on the clamping bolt 18, so that the smooth part of the clamping bolt 18 will project outwardly through the slot 15 and the clamping bolt will be capable of sliding vertically in the slot 13 without turning therein. Adjacent the lower and closed end of the slot 13 the thickened portion 19 terminates at the point 20 thereby defining a shoulder to engage the upper end 21 of the inner tube 22 which is telescoped into the lower end of the outer tube 6. Adjacent the lower end of the tube 22 the walls are radially expanded to provide the annular shoulder 23 to abut the lower end of the outer tube and to define a secure housing for the lower mirror block 24 which includes the mirror 25 set at an approximate angle of 45 degrees and facing the viewing opening 26 formed in the back of the lower end portion of the inner tube. Threaded through the closed lower end 27 of the inner tube is the clamping bolt or screw 28 which is threaded into the block 24 and has its head engaging the bottom 27 so that when screwed in the screw will clamp the block 24 in place.

The camera support which is generally designated 30 comprises the longitudinal standard portion 31 and the transverse head 32. The movie or other camera which is generally designated 33 here shown as equipped with a suitable view finder 33', has embedded in the bottom thereof as indicated by the numeral 34 a depending bolt or screw 35 which works in a slot 36 formed longitudinally in the longitudinal portion 31 as clearly illustrated in Figures 2 and 3. Opposed to the slot 36 is a similar slot 37 and the opposite sides of the standard 31 are formed with additional longitudinal slots 38 and 39 which are opposed. A washer 40 on the screw 35 engages the underside of the bars defined by the slot 36, while a thumb nut or wheel 41, formed as a part of the washer 40 or separate therefrom, but threaded on the screw 35 is of a large enough diameter to project its opposite side portions out through the slots 38 and 39 so as to be readily engageable by the hand of the operator and turned to loosen the clamping action of the screw 35 and permit longitudinal adjustment of the camera 33 along the standard 31, toward and away from the periscope 5. When the desired adjustment is achieved the hand wheel 41 is turned in the tightening direction to clamp the camera in place on the camera support 30.

The cross head 32 is provided with a longitudinal opening 42 which opens through the top and bottom of the cross head and in this opening works the thumb nut 43 which is threaded on the screw 18 already mentioned. The screw 18 works in a longitudinal slot 44 in the rear side of the cross head 32, this arrangement being clearly shown in Figures 2 and 4. The thumb nut 43 has a separate or an integral washer 45 which is adapted to frictionally engage the front sides of the bars defined by the slot 44 to achieve clamping action.

A slide bracket which is generally designated 46 is oval in front elevation as indicated in Figure 6 and is in the form of a block having a semicircular opening 47 in its rear end to slidably conform to the exterior of the upper tube 6 and this block is provided with an opening 48 to rotatably receive the smooth portion of the screw 18. The front of the block has two horizontally aligned pins or lugs 49 and 50 which work on opposite sides of the screw 18 in the slot 44, whereby additional support against deviating out of the horizontal plane, is given to the camera support, so that in the operation of the device of the invention the camera support will remain constantly in any position of adjustment, related to the axis of the viewing tube at approximately 90 degrees in vertical and horizontal planes. It is to be observed that the bolt 18 with its clamping nut 43 is adjustably clampable not only to determine the shifting in a horizontal plane of the camera support, but also the shifting in a vertical plane of the camera support, relative to the periscope.

Although I have shown and described herein a preferred embodiment of my invention, it is to be definitely understood that I do not desire to limit the application of the invention thereto, and any change or changes may be made in the materials and in the structure and arrangement of the parts, within the spirit of the invention and the scope of the subjoined claims.

Having described the invention, what is claimed as new is:

1. A combined camera and periscope comprising a generally horizontal support, a camera resting on said support and having a horizontal viewfinder thereon, said support being formed with a longitudinal slot and said camera having a depending clamping bolt in said slot with a nut thereon to clamp against the bottom of the support and thereby hold said camera in a selected position along said longitudinal slot, said support being formed adjacent one end with a transverse slot extending in a plane parallel to that of said support, a periscope composed of upper and lower telescoped sections, a laterally extending bolt on the upper section traversing said transverse slot wtih a nut to clamp against the face of said support opposite that engaging the upper section of the periscope in the region of the bolt thereby holding said support in a selected position across said periscope, said upper section of the periscope being formed with a vertical slot and the last mentioned bolt being formed with a head vertically slidably confined in said vertical slot whereby the last-mentioned bolt and hence said support are held in a selected vertical position along said upper section of the periscope, a light directing reflector in the upper part of said upper section and aligned with said horizontal viewfinder on the camera, said reflector being set at an angle to reflect the light rays through said upper section and through the lower section of the periscope, and a viewing mirror in said lower section set at an angle to receive and reflect the light rays from said light directing reflector to the eye of an observer.

2. A periscope camera support comprising telescoped tubular upper and lower sections, an upper section having formed therein a vertical slot, a clamping bolt having a head thereon vertically slidably confined in said slot, a generally horizontal camera support formed in its inner end with a transverse slot lying in the plane of the support and slidably receiving said bolt, a nut on said bolt for bearing against a part of said support opposed to said inner end whereby to clamp said support in a transversely and vertically adjusted position relative to said upper section, a light directing reflector in said upper section and facing the direction of said camera support, said reflector being arranged to reflect light through the said upper section and a lower section of the periscope, said lower section of the periscope having a viewing mirror arranged to reflect the light rays from said reflector to the eye of an observer.

RALPH M. SCHOFIELD.